(12) United States Patent
Chan et al.

(10) Patent No.: US 12,423,743 B2
(45) Date of Patent: *Sep. 23, 2025

(54) SYSTEMS AND METHODS FOR THIRD PARTY SATELLITE RADIO ACTIVATION AND MANAGEMENT

(71) Applicant: AVIS BUDGET CAR RENTAL, LLC, Parsippany, NJ (US)

(72) Inventors: Wing Yu Joseph Chan, Randolph, NJ (US); Michael J. Caron, Bryan Township, NJ (US)

(73) Assignee: Avis Budget Car Rental, LLC, Parsippany, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/610,077

(22) Filed: Mar. 19, 2024

(65) Prior Publication Data
US 2025/0045816 A1    Feb. 6, 2025

Related U.S. Application Data

(63) Continuation of application No. 17/558,320, filed on Dec. 21, 2021, now Pat. No. 11,935,115, which is a (Continued)

(51) Int. Cl.
G06Q 30/0645    (2023.01)
G06Q 10/02    (2012.01)

(52) U.S. Cl.
CPC ......... *G06Q 30/0645* (2013.01); *G06Q 10/02* (2013.01)

(58) Field of Classification Search
CPC .......................... G06Q 10/02; G06Q 30/0645
See application file for complete search history.

(56) References Cited

U.S. PATENT DOCUMENTS

| | | | |
|---|---|---|---|
| 8,027,634 B1 * | 9/2011 | Warner | H04H 60/23 340/568.1 |
| 2004/0023647 A1 * | 2/2004 | Mazzara, Jr. | H04B 7/1853 455/12.1 |

(Continued)

OTHER PUBLICATIONS

"Avis Rent A Car: Avis Blast—Portable XM Radio," 1 page, Jul. 8, 2012, retrieved from Internet Archive Wayback Machine on Nov. 7, 2017 (Year: 2012).*

(Continued)

*Primary Examiner* — Scott M Tungate
(74) *Attorney, Agent, or Firm* — Wayne Edward Ramage; Baker Donelson

(57) ABSTRACT

System and methods for management of third party satellite radio activation/deactivation by a vehicle rental service company, wherein satellite radio services may be provided in a rental car when requested by a customer. The systems and methods will enable activation of a satellite radio shortly before or at the start of the rental period, and activation may be altered by the vehicle rental service company in the event that the rental period is shortened or extended, or if the vehicle is exchanged. The systems and methods deactivate the satellite radio service at the end of the rental period. The systems and methods may also be used to activate or deactivate other equipment or services made available via a vehicle rental service company in response to a customer request.

5 Claims, 9 Drawing Sheets

Related U.S. Application Data continuation of application No. 16/821,586, filed on Mar. 17, 2020, now Pat. No. 11,205,221, which is a continuation of application No. 14/057,662, filed on Oct. 18, 2013, now Pat. No. 10,592,974.

(56) References Cited

U.S. PATENT DOCUMENTS

| | | | | |
|---|---|---|---|---|
| 2006/0240811 A1* | 10/2006 | De Luca | ........... | H04W 4/50 |
| | | | | 455/414.3 |
| 2007/0168217 A1* | 7/2007 | Weas | ........... | G06Q 10/06 |
| | | | | 705/306 |
| 2009/0299777 A1* | 12/2009 | Silberman | ...... | G07C 9/00563 |
| | | | | 705/5 |
| 2010/0036560 A1* | 2/2010 | Wright | ........... | B60R 16/037 |
| | | | | 701/36 |

OTHER PUBLICATIONS

Heitmann, Marcus. "Security risks and business opportunities in in-car entertainment." Embedded Security in Cars. Springer, Berlin, Heidelberg, 2006. 233-246. (Year: 2006).*

* cited by examiner

SYSTEMS AND METHODS FOR THIRD PARTY SATELLITE RADIO ACTIVATION AND MANAGEMENT

This application is a continuation of U.S. patent application Ser. No. 17/558,320, filed Dec. 21, 2021, which is a continuation of U.S. patent application Ser. No. 16/821,586, filed Mar. 17, 2020, which is a continuation of U.S. patent application Ser. No. 14/057,662, filed Oct. 18, 2013. The complete disclosures of U.S. patent application Ser. Nos. 14/057,662 and 16/821,586 and PCT/US14/60459 are incorporated herein in their entireties by specific reference for all purposes.

BACKGROUND OF THE INVENTION

Many vehicle rental companies utilize vehicles equipped with in-car satellite radio systems. Unfortunately, companies that provide vehicle rental services have no ability to control the activation or deactivation of such systems. Consequently, vehicle rental service companies often do not activate such systems, and rental customers are often unable to access such services.

Some vehicle rental service companies have overcome this limitation by offering customers the opportunity to rent a portable satellite radio device, which provide access to satellite radio services. These devices typically are provided to the customer at a rental agency counter, and the customer must take the device to the vehicle and install it, often by connecting the unit to the vehicle radio via a cable plugged into an auxiliary jack. The customer must also connect the device to a power supply, such as via a cable plugged into the vehicle lighter assembly. While providing the desired service, such portable radio devices are problematic in several respects, in that they are bulky and create a nuisance value as customers have to carry something "extra" to the vehicle. Furthermore, the devices create logistical issues for the rental service, as complicated procedures are required for the collection, storage, allocation, distribution and return of the devices. For example, the service must ensure that particular rental locations have such portable devices available if the customer requested a radio during the reservation, or at the time of rental check-out Verification of the return of the portable unit, along with logistics for devices that have been lost or damaged creates additional overhead and complexity.

By enabling a rental customer to access satellite radio services through an in-car satellite radio system, such as a factory installed satellite radio, the present invention eliminates this "extra nuisance" from the customer perspective, providing for a better rental experience. The present invention also eliminates the need for portable satellite radio units, and the costly logistics associated with use of portable devices, thereby reducing rental agency service expense and overhead.

In accordance with the present invention, satellite radio services will be available to rental customers through an in-car satellite radio. The service can be requested by the rental customer at the time of reservation, or at the time of rental vehicle pick-up. The satellite radio service will be activated during the period of time specified in the rental contract, and suspended at the conclusion of the rental period, permitting the service to be provided to only those customers that request satellite radio services. By allowing customers to choose whether the rental should or should not include satellite radio services, and to provide such services Without the need for the customer to carry and install the device, customer service will be improved, thereby allowing the rental service agency to increase use of the service and generate more revenue.

In accordance with the present invention, the system and method enables a rental customer to book satellite radio service for their rental when creating a reservation or modifying an existing reservation. The satellite radio service will be activated shortly before, or at the time the vehicle is checked-out of the rental establishment. In addition, the system and method may alter the activation period of the satellite radio service, in the event that the rental period is extended, or if the vehicle is exchanged. Activation, deactivation, and exchange is accomplished via a system and method that creates applicable fields in a rental reservation, and communicates an applicable activation message to the satellite radio service provider, to enable the service provider to activate/deactivate the satellite radio in the vehicle associated with the reservation, in the time frames specified by the vehicle rental service company.

SUMMARY OF THE INVENTION

The following relates to systems and methods for third party activation and • management system that is particularly applicable to satellite radio services. The systems and methods enable a vehicle rental service company to offer in-car satellite radio services as an option that the customer may purchase for use during rental of a vehicle.

The systems and methods of the present invention create an electronic record at the time that an auto rental reservation has been created where satellite radio services have been requested. Prior to the contracted rental period, the systems and methods will communicate with a satellite radio service provider and transmit a message to the satellite radio service system interface requesting activation of the in-car satellite radio for the vehicle associated with the rental contract. The message will contain one or more codes identifying, for example, the vehicle number (VIN) or a unique identifier (ESN) for the installed device associated with the rental vehicle, the date and time to activate the satellite radio service on the satellite radio device installed in the rental vehicle, and the date and time to terminate the satellite radio service in the rental vehicle. The satellite radio service will then transmit an activation signal to that specified device. The activation message originating from the vehicle rental system may be sent as part of an automated process, as is the case when a renter completes the rental process directly, by bypassing a rental agent contact, or in response to a request processed by a rental agent, when the renter makes or alters a reservation just prior to check-out. In addition, the systems and methods enable the processing of orders to change activation instructions before and after transmission to the service providers, to accommodate for changes to the vehicle rental period or the satellite radio service period. Once activated, the rental customer will be able to use the in-car satellite radio to receive satellite radio programing distributed by the satellite radio service. At the conclusion of the rental period, utilizing the systems and methods described herein, the satellite radio service will transmit a deactivation code to deactivate the satellite radio in the specified rental vehicle.

BRIEF DESCRIPTION OF THE DRAWINGS

The above and other objects and advantages of the invention will be apparent upon consideration of the following detailed description, taken in conjunction with the accompanying figures, in which like reference characters refer to like parts throughout, and in which.

DETAILED DESCRIPTION OF THE EXEMPLARY EMBODIMENTS

The present invention is described below with reference to the illustrative diagrams in accordance with the invention. It is understood that the systems and methods described in each of the diagrams may be implemented by means of analog or digital hardware and computer program instructions. These computer program instructions may be provided to a processor of a general purpose computer, a special purpose computer, or other programmable data processing apparatus, such that the instructions, which execute via the processor of a computer or other programmable data processing apparatus, implement the functions/acts specified in the diagrams and text of this application.

Headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must).

General System Overview

Figure 1:
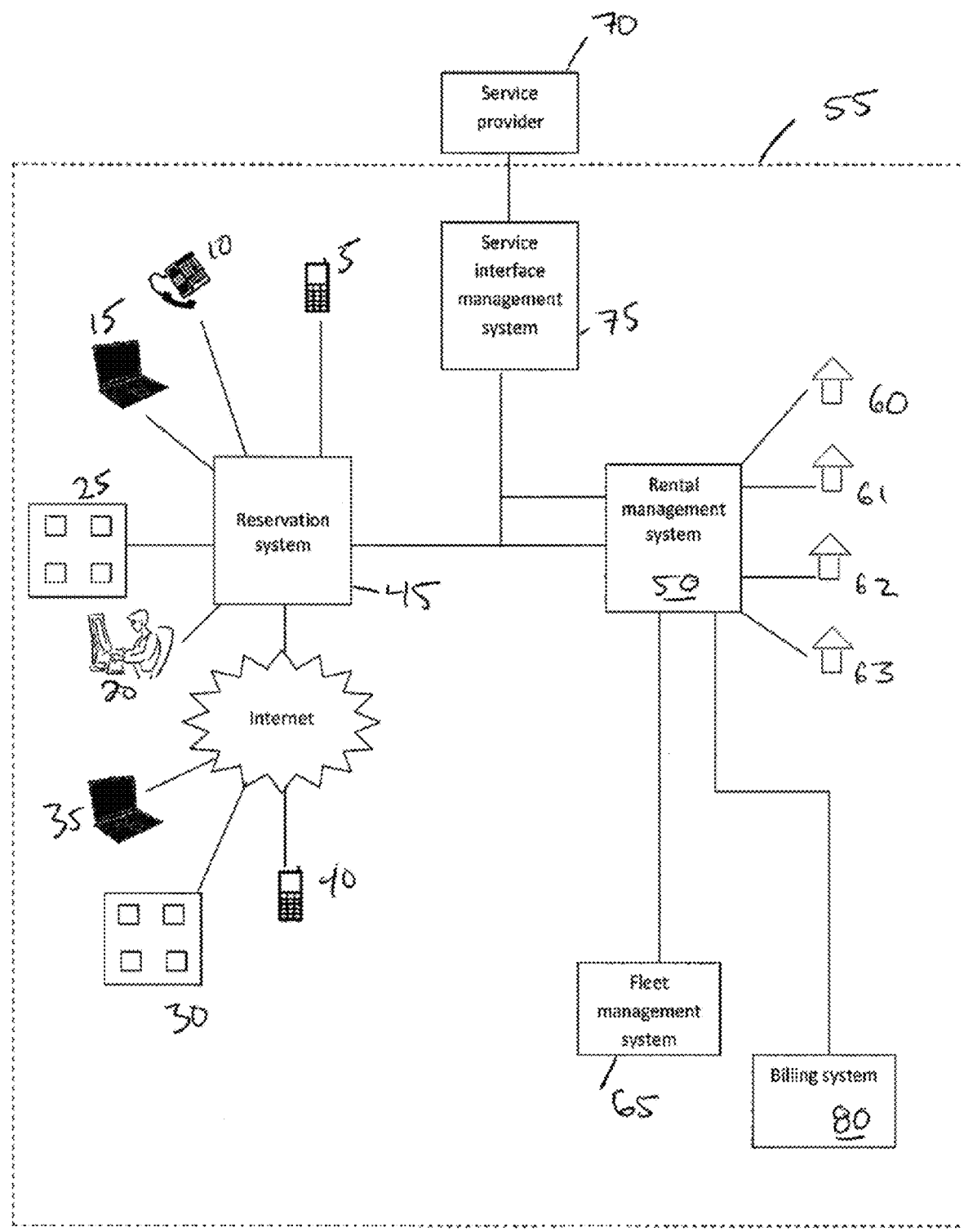
FIG. 1 is an exemplary illustration of a network for implementation of systems and methods of the present invention.

FIG. 1 illustrates an exemplary network for implementation of systems and methods for third party management of satellite radio services. The services and methods are controlled by a rental management system, which typically manages all aspects of vehicle rentals. Such management systems typically include a mainframe computer system, connected to servers that run different aspects of the system, such as reservations, financial processing, fleet information and management, customer data and communications, external communications, and security systems, etc. The system is also connected to one or more databases and data storage systems and equipment, including back-up systems. However, alternative network configurations are possible, including configurations that include cloud based systems, as will be understood in the art.

As shown in FIG. 1, customers may connect to the reservation system through a variety of means, to create a vehicle reservation. These connections include, for example, direct and indirect connections to the vehicle rental service company via mobile devices 5, wired devices 10, 15, in-person agents 20, and internet connected devices 35, 40. Persons may also connect to the reservation system, and create a reservation via third party reservation agents and services, including travel agencies, online services, and services managed by airlines, credit card companies and other entities 25, 30. Well-known reservation systems commonly used to make vehicle rental reservations include Sabre, Amadeus, Galileo and Worldspan. Reservations may also be made via an app.

Reservations are created in a reservation system 45 via a reservation application, which runs on equipment that is connected to, or part of, rental management system 50, which forms a central hub of the overall network 55. The rental management system 50 is networked to local rental facilities 60, 61, 62, 63, so that reservation information can be delivered to the local facility designated in the reservation for fulfillment or modification as needed at the facility.

Management of fleet vehicles, including vehicle availability and equipment, is managed by a fleet management system 65, which may be part of or connected to the rental management system 50. The fleet management system 65 may also communicate with the local rental facilities regarding the availability of rental vehicles, which is needed for reservations and fulfillment.

The rental management system 50 is also connected to equipment associated with a service provider 70, such as a satellite radio service provider. This connection is controlled by a service interface management system 75. At the appropriate time, the rental management system 50 communicates a request, via the service interface management system 75 and the network connection, to the satellite radio service provider 70, to activate a particular satellite radio device. In accordance with the request, the satellite radio service provider 70 will transmit an activation signal and, later, a deactivation signal to the in-car satellite radio device to activate/deactivate it in accordance with the data and instructions contained in the request.

The network 55 includes billing system 80, which enables the rental management system to invoice customers for the services that are activated, and to track activations for purposes of financial arrangements with the service provider. The billing system processes invoices and credit card charges for payments associated with rentals, and connects to one or more databases and data storage systems to process and store transaction data, customer preferences, and rental records.

Figure 2:
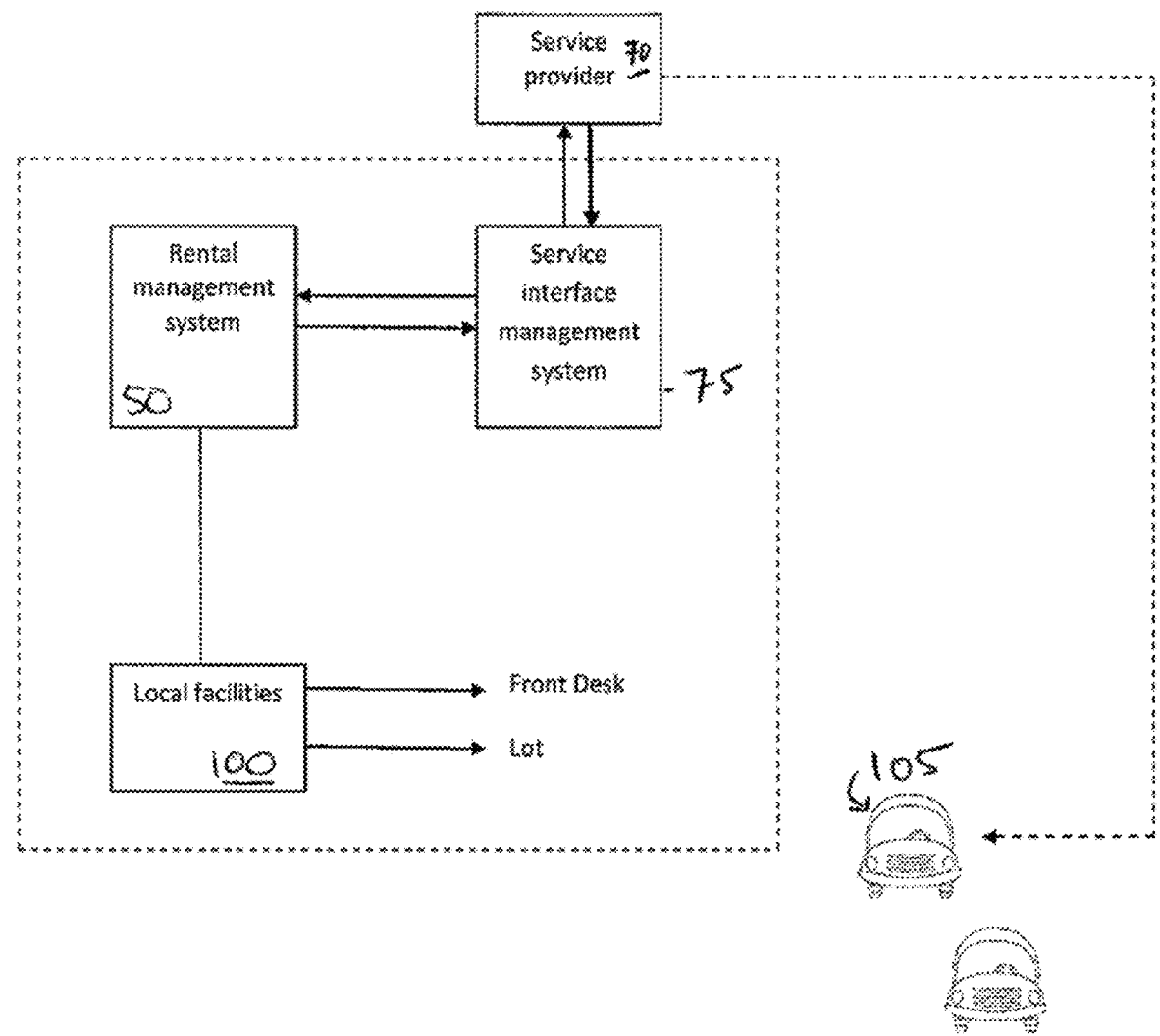
FIG. 2 is an exemplary illustration of network connections for management and activation/deactivation of services in rental vehicles through the systems and methods of the present invention.

As shown in FIG. 2, the local facilities 100 include a vehicle lot and a front desk, where rental agents are available. A customer may interact with the vehicle rental service company at these facilities to request services or change a pre-existing reservation. These facilities are connected to the rental management system 50. In the preferred embodiment, the rental management system 50 may engage in two-way communication with the satellite radio service provider's system, via the service interface management system, to send activation/deactivation requests and associated data to the satellite radio service provider, and receive confirmation of activation/deactivation requests. This two-way communication may also include communication about fleet data, including fleet vehicles, and data concerning satellite equipment installed on fleet vehicles, as described later in this application. Once the service provider has received information from the rental management system identifying the vehicle or satellite radio device to be activated, with data comprising at least the date and time of activation, the service provider 70 transmits a satellite radio activation signal to the identified satellite radio device 105 to activate it. Since in-car satellite radios typically comprise only receivers, these activation signals are one-way, and may be repeated over a designated period of time by the satellite radio service provider to ensure that the designated radio is activated. Further, in the preferred embodiment, activation is requested prior to the start of the rental period, so that the customer will receive an automobile at the time of pick-up with a working in-car satellite radio. Depending on the equipment and programming options provided by the satellite radio service provider, the activation scheme could include providing the satellite radio service provider with instructions including future activation and deactivation dates and times, activation date and time with separate instructions for deactivation date and time, and notifying the satellite service provider at the exact time that activation or that deactivation is required.

Figure 3:
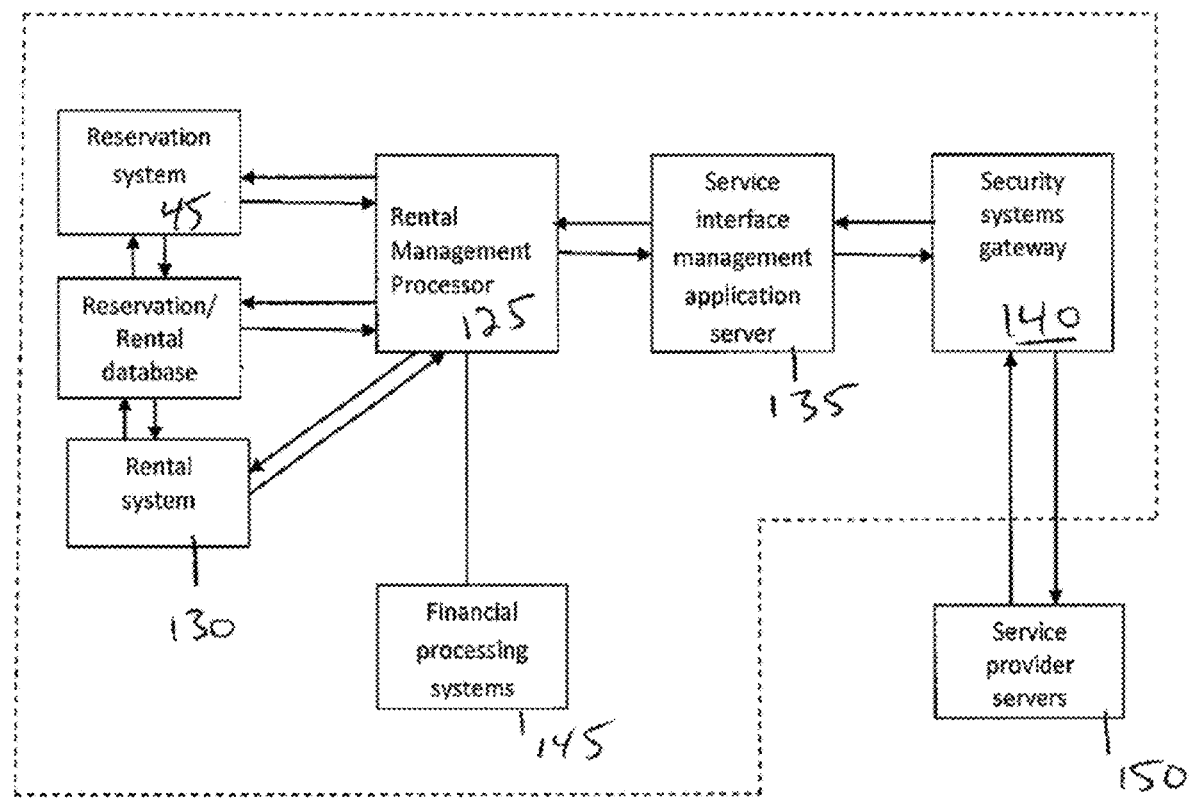
FIG. 3 is an exemplary illustration of a computer network for the systems and methods of the present invention.

As shown in FIG. 3, the rental management system includes a rental management processor 125, which may be a mainframe computer system. The rental management processor interacts with reservation system 45, which creates and manages reservations. The reservation system 45 and rental management processor 125 also communicate with a reservation/rental database, which stores reservation data, and a rental system 130, which manages and tracks rentals in progress. The reservation system and rental system may operate as part of the mainframe computer system, although other configurations would also be suitable. In a mainframe configuration, the mainframe interacts with various application servers, including servers that provide communications capability outside the rental management system. These servers may include, for example, a server for communicating with service provider servers 150, such as service interface management application server 135. The servers may also provide network security, such as that provided by security systems gateway 140. The servers providing communications capability enable communication with and transmission of activation/deactivation messages to the equipment operated by satellite radio or other service providers 150. Financial processing systems 145 may be part of the mainframe computer system, or may be run on one or more servers separate from the mainframe.

Checkout System Overview

The following paragraphs provide examples of how the inventive system may be configured to handle vehicle check-outs. However, given the complexity of vehicle rental reservation systems, and the number of methodologies that may be employed to complete the rental process, these examples should not be viewed as exclusive. The described system may be adopted and implemented in additional ways without departing from the spirit and scope of the invention.

Figure 4:
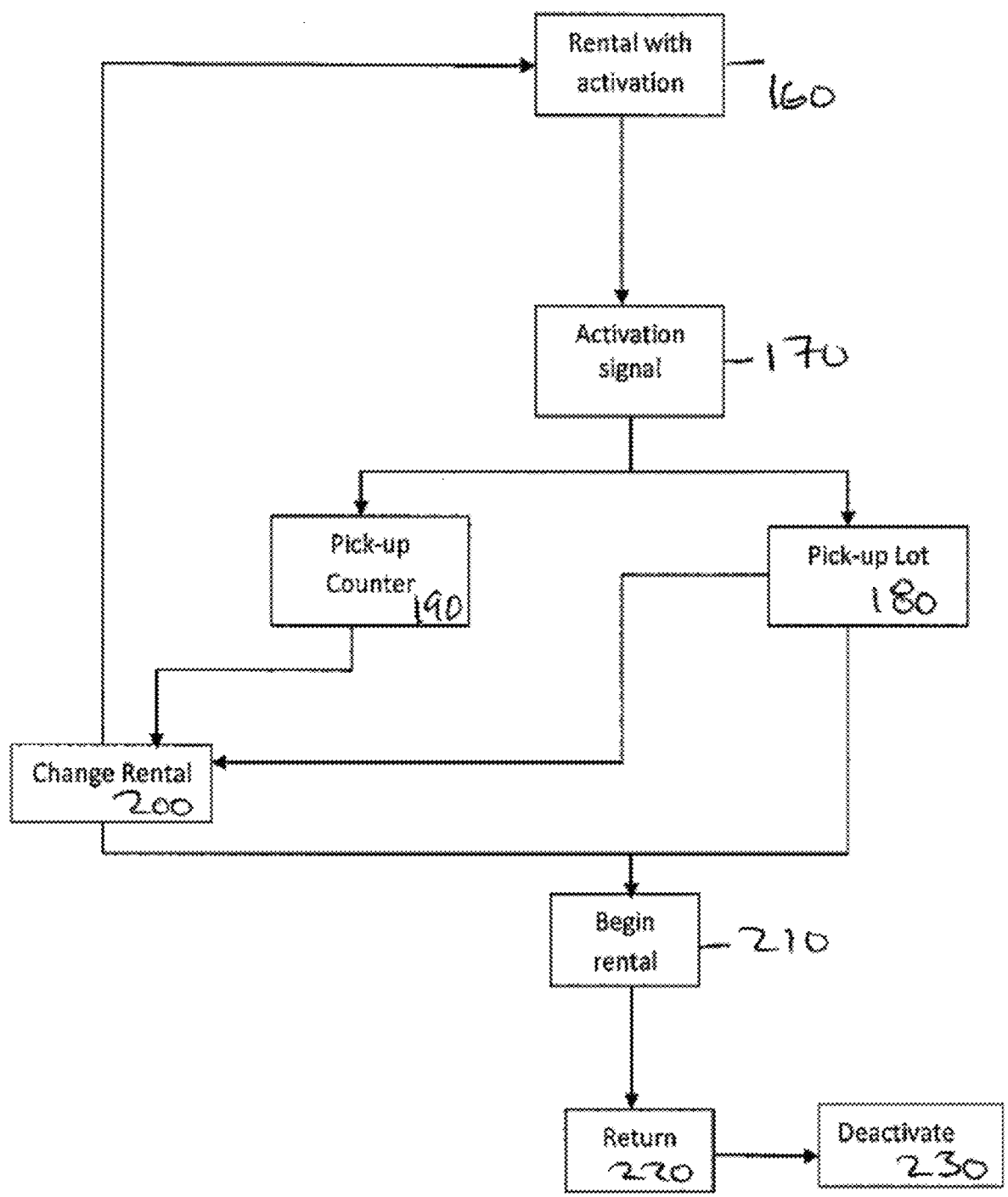
FIG. 4 is an exemplary overview of reservation management from the customer's perspective for a vehicle rental reservation that includes satellite radio services.

FIG. 4 illustrates an exemplary overview of the reservation management from the customer's perspective for a vehicle rental reservation that includes satellite radio services. Initially, a customer makes a reservation for a rental vehicle, and may select the option of having satellite radio services as part of the rental 160. The system will convert that selection to a special equipment code for an in-car satellite radio device. The special equipment code will be one of the tracked and tabulated values associated with the reservation. Prior to the customer arriving at the pick-up facility, the system will assign a vehicle to the reservation consistent with the features selected by the customer. In this scenario, the vehicle assigned to the reservation includes in-car satellite radio equipment.

Next, the customer arrives at a particular rental location to pick-up the reserved vehicle at an appointed time. Depending on the facility and the vehicle rental service company, the customer may be able to proceed directly to the assigned vehicle for check-out 180. If so, the customer proceeds to their vehicle, the contract is finalized, and the customer may leave the premises with the assigned vehicle 210. For reservations involving direct customer check-out, the system will request transmission of an activation message to the satellite radio service provider prior to the arrival of the customer, resulting in transmission of an activation signal 170 prior to the start of the rental contract. The preferred time for activation is about 5 minutes to about 15 minutes prior to the reservation. In such manner, the customer may use the in-car satellite radio device as soon as they arrive at the vehicle, and activation may be confirmed as the customer leaves the facility and finalizes the contract.

At certain facilities, or for certain rentals, or if the customer desires to modify a reservation, the customer may visit a service counter to complete the rental transaction check-out 190. In such cases, where the contract specifies the services and the assigned vehicle includes the satellite radio services, when the vehicle is changed or assigned at check-out 200, the system will send a message to the satellite radio service requesting immediate activation of the associated in-car satellite radio system. As a result, the in-car device will be activated just prior to or shortly after check-out is completed. The rental period then begins 210. At the conclusion of the rental term, the vehicle is returned 220 and the satellite radio is deactivated 230. The satellite radio services may be terminated at the time of return or at the time the contract is set to expire.

Figure 5:
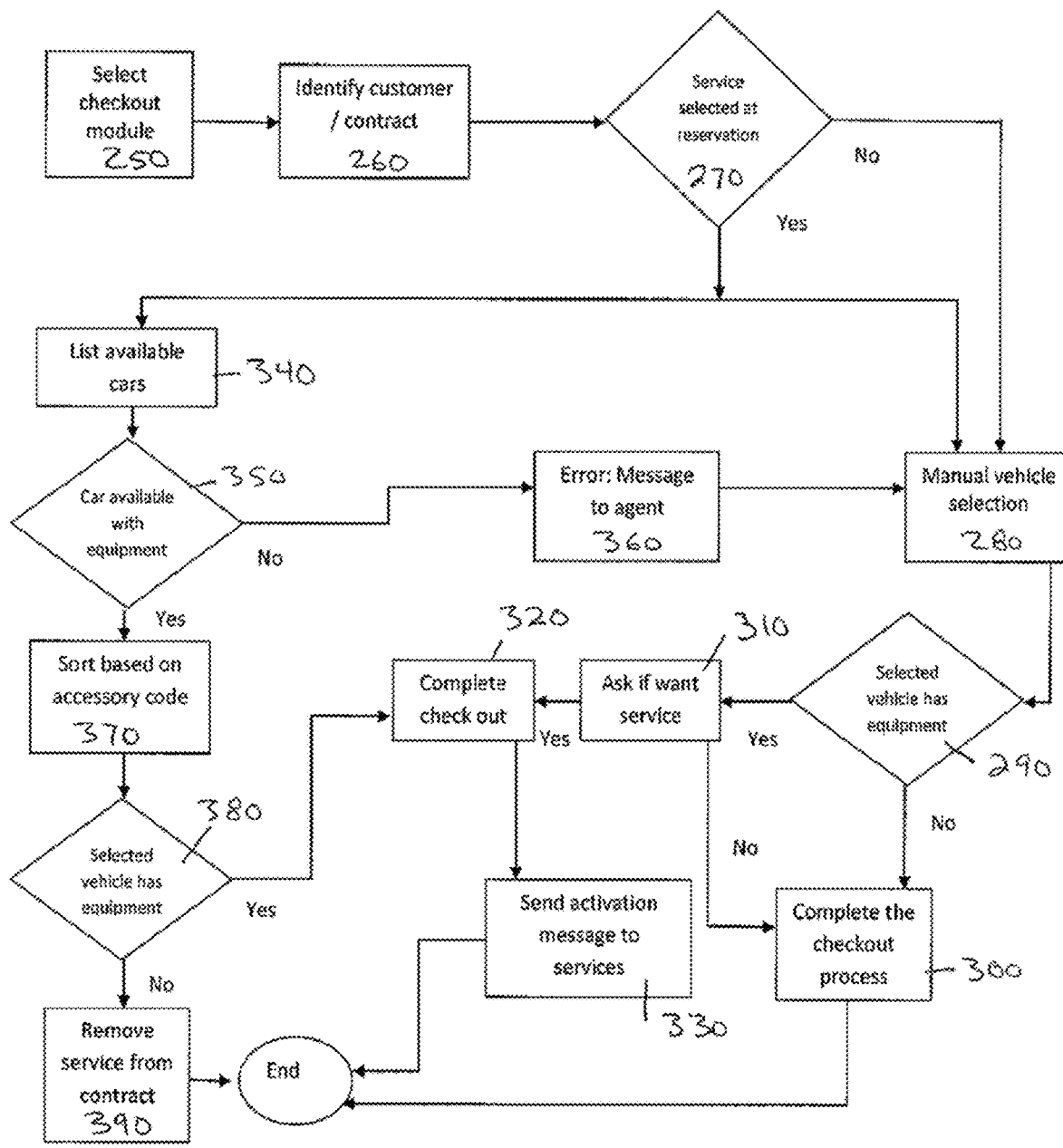
FIG. 5 is an exemplary illustration of systems and methods for managing customer checkouts for rentals that include the ability to request in-car satellite radio services.

FIG. 5 contains a flow chart illustrating how a system in accordance with the invention can manage customer check-outs that do not involve direct vehicle pick-up. As shown in FIG. 5, the checkout module is started when a customer arrives at a rental facility to pick-up a vehicle 250. First, the system must identify the customer and the reservation 260. As illustrated by the decision tree in FIG. 5, the system determines whether the reservation includes a request for satellite radio service 270. If the answer is "no" then the customer, or an agent completing the checkout process for the customer, will make a vehicle selection 280. Once the vehicle selection has been made, the system will then determine whether the selected vehicle has an installed satellite radio device 290. If the answer is "no" then the checkout process is completed 300. If the selected rental vehicle includes an installed satellite radio device, the customer may again be asked whether they desire satellite radio service 310. If the customer does not request the service, checkout is completed 300. If the customer does request the service, the system adds the service to the reservation, checkout is completed 320 and an activation message is sent to the satellite radio service 330 to immediately activate the radio in the assigned vehicle.

If the initial reservation included a request for satellite radio service, a vehicle may be selected manually from a list of available vehicles 280. Further, as some vehicle rental companies maintain lists of vehicles "ready" for rental, the system may display a "ready list" 340, which can be sorted by an accessory code for "satellite radio" 370. Once a vehicle is selected, the system confirms whether the vehicle includes satellite radio equipment 380. If not, satellite radio services may be deleted from the reservation—390 and the customer or agent notified with a message such as, "Selected Vehicle Does Not Have Requested Equipment, Option Will Be Removed." If a suitable vehicle with satellite radio equipment is selected, the satellite radio feature option will be included in the reservation and the checkout process completed 320. Thereafter, the system will transmit an activation message to the satellite radio service provider to immediately activate the service on the associated in-car satellite radio device 330.

When the appropriate reservation field specifies satellite radio services, and the selected vehicle has satellite radio equipment installed in it, the rental management system 50 will detect this match and transmit via the service interface management system 75 a message to the satellite radio service provider to activate the radio in the vehicle assigned to the reservation. For all other conditions, an activation message will not be sent to the satellite radio service provider. This process of message sending from the rental management system to the satellite radio service provider will be followed for all type of rentals i.e., real time, delayed and future rentals.

After the customer returns the vehicle at the conclusion of the rental period, the satellite radio service provider will transmit a deactivation signal to deactivate the in-car satellite radio device as previously scheduled. The system may also be configured to request transmission of a deactivation code when the vehicle is actually returned to a rental facility.

Figure 6:
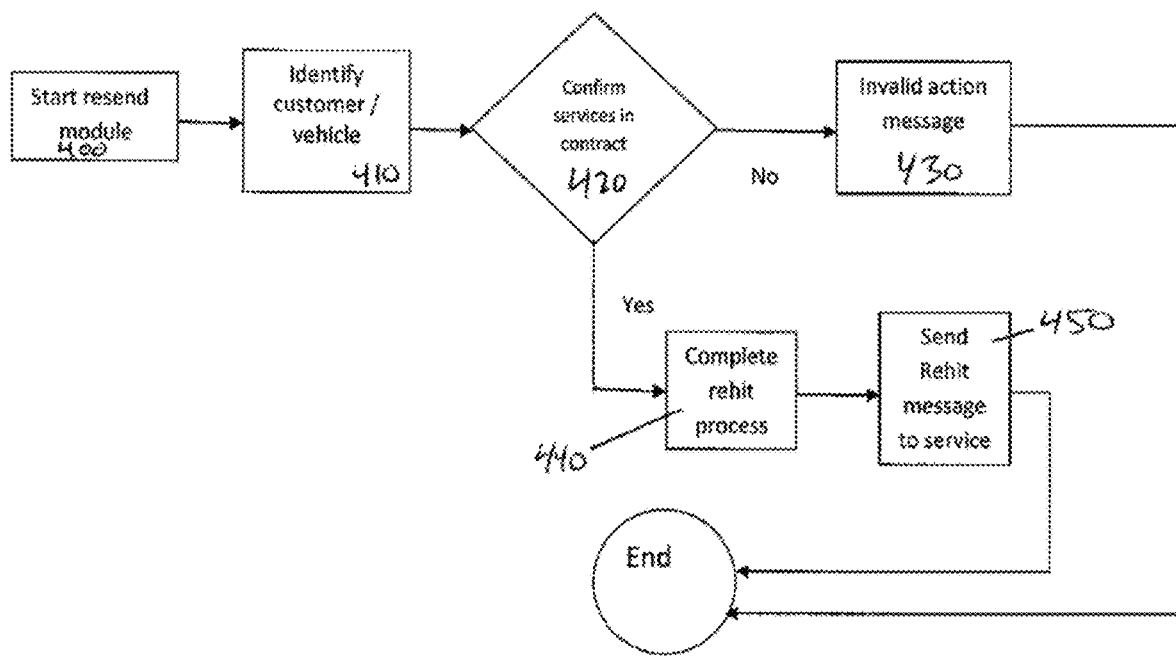
FIG. 6 is an exemplary illustration of a system for managing unsuccessful satellite radio unlocks in connection with vehicle rentals.

The vehicle rental service company can provide by telephone (or any other viable means of communication), dedicated customer service and support to address any issues encountered regarding activation or use of the in-car satellite radio device. This service and support may include, if need be, re-transmitting an activation request as shown in the reset module of FIG. 6. This module is configured to enable the system to resolve unsuccessful satellite radio unlocks. The module may be activated when a customer reports that satellite radio activation was not successful. As shown in FIG. 6, once the module is selected and started 400, the reservation contract or customer account must be identified 410. Next, the system confirms whether the contract includes satellite radio services 420. If the answer is "no" then the system will deliver an invalid action message 430 and conclude. If the answer is "yes" then the system will complete a "rehit" process 440 and transmit a message to the satellite radio service provider to resend an activation code to the assigned vehicle's in-car satellite radio 450.

Rental Modification Overview

Figure 7:
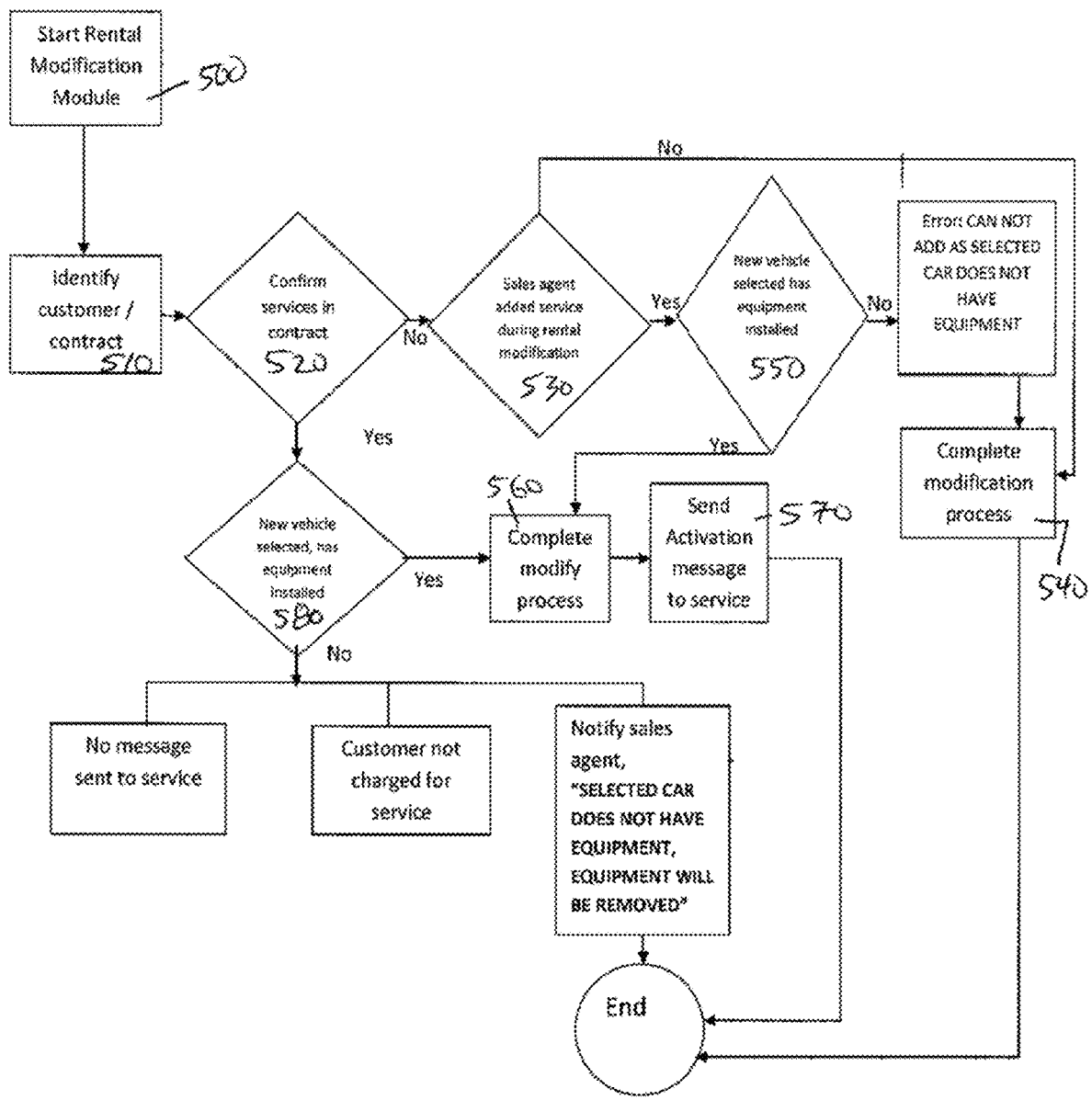
FIG. 7 is an exemplary illustration of systems and methods for managing activations/deactivations of satellite radio services in conjunction with modification of a vehicle rental contract.

FIG. 7 illustrates a rental modification module for use with the system and method. Through this module, the system is configured to accommodate modifications to rental contracts. As shown in FIG. 7, once the module is activated 500, the reservation contract or customer account must first be identified 510. Thereafter, the system will determine whether the original contract specified satellite radio services 520. If the answer is "no", the system will ask whether these services were added during the rental modification 530. If the answer is "no", the contract modification proceeds to completion 540. If satellite radio services were added to the contract during modification, the system determines whether the selected vehicle includes satellite radio equipment 550. If the answer is "no" then the rental agent is trying to add the services to a vehicle that is not equipped to provide these services, and the system will return an error message, such as "Cannot Add As Selected Car Does Not Have Equipment." An alternative vehicle can be specified, or the system can delete the services from the modification request. If the modification specifies the services, and the vehicle has the necessary equipment, the system will complete the modification process 560 and send a new activation message to the satellite radio service 570. If the original contract specified satellite radio services, the system will query whether the assigned vehicle system has an installed satellite radio device 580. If the answer is "yes" then the system will complete the rental modification process 560 and send a new activation message to the satellite radio service 570. If the answer is "no", an error message will be returned, such as "Selected Car Does Not Have Equipment, Equipment Will Be Removed." Thereafter, an alternative vehicle could be selected, or the services can be removed from the contract.

Rental Extensions Overview

Figure 8:
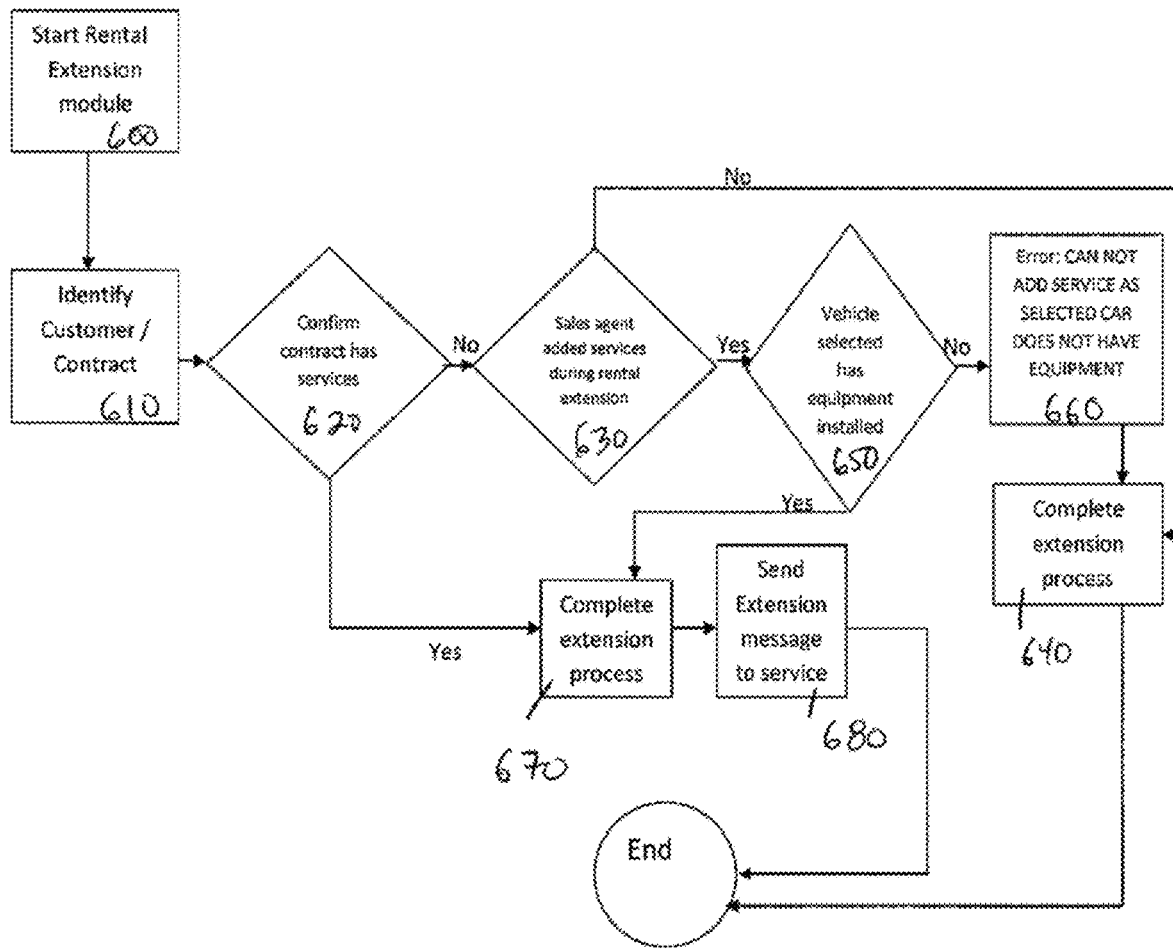
FIG. 8 is an exemplary illustration of systems and methods for managing satellite radio services in vehicles subject to extensions of the vehicle rental contract.

FIG. 8 illustrates a rental extensions module for use with the systems and methods of the present invention. This module can configure the system to manage extensions to the rental period for vehicles with an installed satellite radio device. As shown in FIG. 8, once the module is activated for a contract extension 600, the reservation contract or customer account must be identified 610. The system will then query whether the original contract specified satellite radio services 620. If the answer is "no", then the system will determine whether the extension includes the addition of such services 630. If the answer is "no", the extension is completed 640. Returning to the query as to whether the rental agent modified the contract to specify satellite radio services during the rental extension, if the answer is "yes" then the system will determine whether the vehicle associated with the extension has an installed satellite radio device 650. If the answer is "no" then the system returns an error message such as, "Can Not Add Service As Selected Car Does Not Have Equipment" 660. The services are next removed from the extension process, and the extension is completed 640. If the answer is "yes" the system will complete the extension 670 and will send a new activation message to the satellite radio service provider for activation of the satellite radio device in the assigned vehicle 680. Returning to the initial system query as to whether the original contract specified satellite radio services, if the answer is "yes" the vehicle already has an activated satellite radio, the extension is completed 670, and the system sends a message to the satellite radio service provider to alter the prior activation instructions 680. This message may be in the form of an activation request with an extra field to signify that this is an extension to the original activation period. No message is transmitted for any other type of contract modification.

Vehicle Exchange Overview

Figure 9:
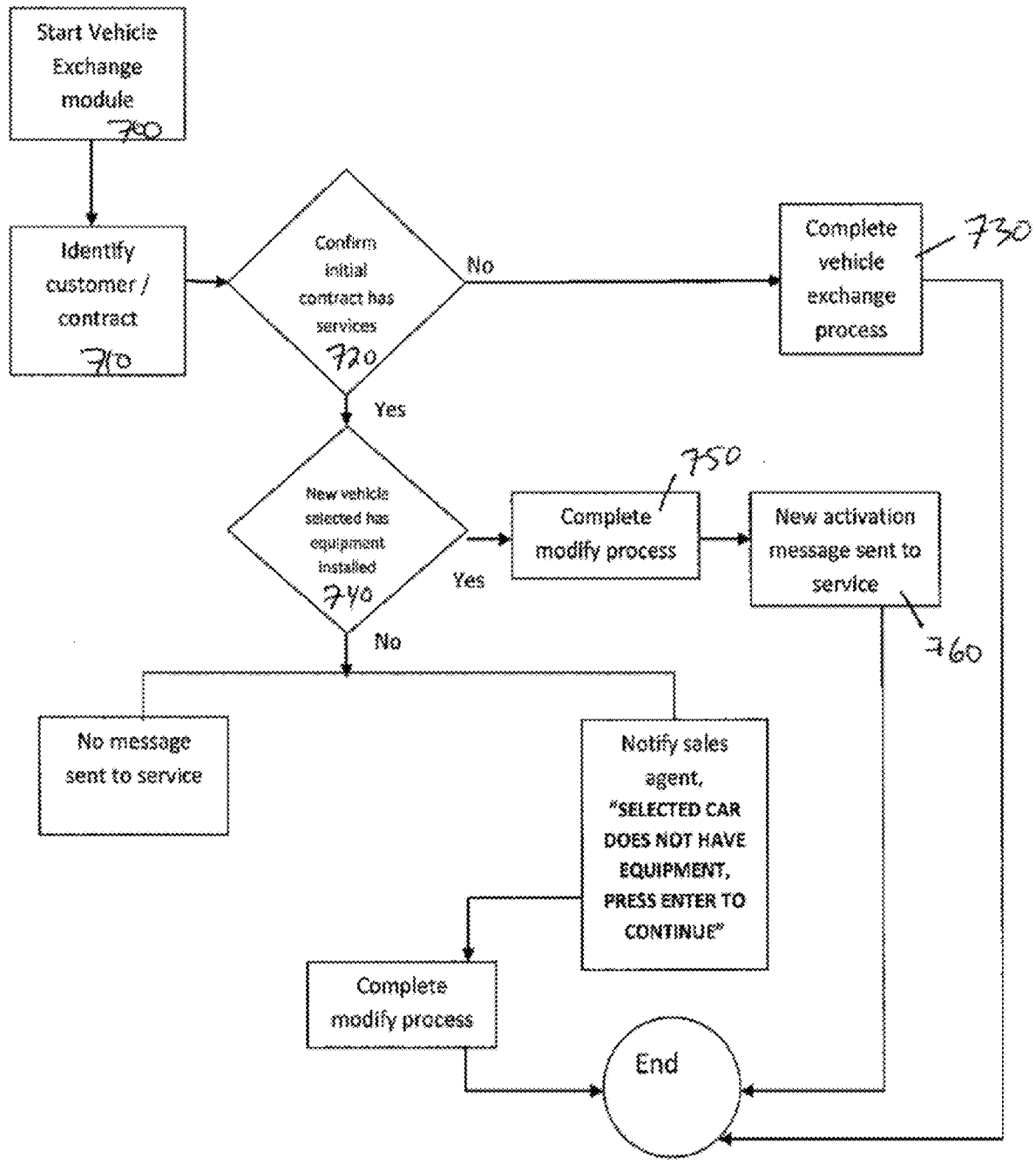
FIG. 9 is an exemplary illustration of systems and methods for managing vehicle exchanges for rentals with an installed satellite radio device.

FIG. 9 illustrates a vehicle exchange module for use with the systems and methods of the present invention. Through this module, the system is configured to accommodate changes to rental contracts involving vehicle exchanges. As shown in FIG. 9, once the module is activated 700, the reservation contract or customer account must be identified 710. Next, the system will determine whether the original contract specified satellite radio services 720. If the answer is "no" then the vehicle exchange is completed and concluded 730. If the answer is "yes" then the system queries whether the new vehicle has satellite radio equipment 740. If the answer is "yes" the exchange will be completed 750, and the system will send a new activation message to the satellite radio service provider to activate the satellite radio equipment in the new vehicle 760. If the answer is "no", the new vehicle does not have an installed satellite radio device and the system returns an error message, such as "Selected Car Does Not Have Equipment, Press Enter To Continue." A different vehicle may be selected and the process repeated, or the specified satellite radio services are removed from the reservation contract and the modification process completed. Exchanges may be done in real time, or may be set for a future time when the customer is scheduled to arrive at the rental facility. If set for a future time, and if an activation message is required, it will be transmitted shortly before the scheduled start of the exchange period.

Activation and Deactivation Process Overview

The system may perform activation and deactivation for satellite radio services in a variety of ways. In the preferred embodiment, a mainframe computer system, which receives customer reservation information, generates activation/de-activation messages, with tracked and tabulated data entering a message queue. The following data may preferably be stored in the message queue for each contract specifying the services:
(i) Rental agreement number;
(ii) Check-out location;
(iii) Check-in location;
(iv) Check-out date and time;
(v) Check-in date and time;
(vi) Length of rental;
(vii) VIN;
(viii) Request type (Unlock/Extend/Rehit/Exchange);
(ix) Corporate code;
(x) MVA (motor vehicle administration information).

The data in the message queue is transferred from the mainframe to application servers used for further processing. The application servers convert the check-out date/time into EST based on the rental location time zone using a location database. Check-in time will be converted to UTC (Coordinated Universal Time) time zone or another time zone specified by the satellite radio service company or other third party service provider. The application servers determine whether the checkout date and time is in the future and, if so, will put the data on a delayed message queue with a "ready to send flag" as "false" and "retry time" as x minutes before the check-out time. The application servers will constantly poll delayed messages for "ready to send flag" as false and "retry time" as the current time. When the application servers identify a message in the queue as the current time, the ready to send flag can be changed to true, and the message transmitted to the satellite radio service provider.

The servers may be configured to send, for example, a simple object access protocol (Soap) request to servers operated by the satellite radio service provider to unlock the installed satellite radio device on the identified rental vehicle. The system can also be configured to transmit requests using other protocols, including protocols that may be necessary for interaction with a particular third party satellite service provider, or other third party service provider. All message and request transmissions are carried out by secure sockets layer (SSL) or other forms of encryption, and internal networks are protected by a security gateway and firewall. External networking with the satellite radio service system servers may occur via Ethernet or other known communication pathways and technologies.

Requests may be sent in real time to the satellite radio service provider in the following conditions:
(i) If the checkout date and time is the current date and time;
(ii) If the checkout date and time has already past (delayed check out);
(iii) If the request is for vehicle exchange.

If the request is for a rental extension, the application servers will send an extend request to the satellite radio service with the new end date in UTC format. If a rental agent sends an unlock request using a new action code, then the servers will send a rehit transaction to the satellite radio service.

Depending upon the system configuration, the application servers will formulate a Soap request and read the Soap response from the satellite radio service provider. For example, the response may include a service request result code and result description. This data object will hold the data that has to be transferred between the mainframe and the third party service, and may be stored in a database for future reference. In addition to the data transmitted to the original Soap, the data object may also include a unique request Id, and a corporate Id.

Fleet/Defleet Management System

A vehicle rental service company may have a dynamic fleet of vehicles, with many vehicles being added and removed from the fleet on a daily basis. Further, certain vehicles may be specialty vehicles that are not subject to a particular program, such as the satellite radio rental program. For these reasons, it is important to maintain accurate, up to date information on the fleet, and the equipment installed in each vehicle. Accordingly, another aspect of the invention is the fleet data management system.

As shown in FIG. 1, the system and method of the present invention includes the use of a fleet management system 65, which generates and maintains a database of fleet information. This database includes information about fleet vehicles and the equipment installed on each vehicle in the fleet. The database may include, for example, for each vehicle in the fleet, VIN number, equipment serial numbers, accessory codes, and designations as to whether the vehicle is or is not included in particular service programs. The fleet management system 65 updates the fleet database on a regular basis to reflect changes in the fleet, including in-fleeting (additions to the fleet) and de-fleeting (removal of vehicles from the fleet), changes to equipment serial numbers and accessory codes reflecting vehicle equipment changes, and changes to service program participation. The preferred embodiment includes the assignment of an accessory code to each vehicle in the fleet indicating whether a vehicle has satellite radio equipment, and the status of that equipment (e.g., activated, initial set-up complete, awaiting initial set-up).

The fleet database may be created or supplemented with the assistance of the satellite radio service provider. For example, the vehicle rental service company may provide the satellite radio service provider with a list of vehicles in the fleet, typically including VIN or MV A number, make, model and year. The satellite radio service provider may thereafter create a list or table including radio serial numbers that correspond to the provided VIN or MV A numbers, which may be transmitted to the vehicle rental service company, along with a file to be utilized by the fleet management system 65 to confirm that each vehicle in the fleet database is also present in the satellite radio service provider list. The satellite radio service provider and vehicle rental service company may also communicate any discrepancies or errors noted in their respective lists, including via the exchange of electronic error codes. These errors may be investigated to determine whether the data utilized by the fleet management system is inaccurate or whether the service provider's data is inaccurate. The fleet information data is exchanged through the service interface management system 75 connection to the service provider 70, using secure file transfer protocols.

The fleet information data may also include a code to identify vehicles participating or not participating in the program. For example, this can also be accomplished with an accessory code to denote a special vehicle versus a regular vehicle. This is useful where, for example, certain vehicles have the satellite radio service always active, while vehicles in the program may have the satellite radio service in an active/locked mode, to be unlocked in accordance with the systems and methods of the present invention.

If fleet data is exchanged with the satellite radio service provider, the data fields may include a unique transaction Id, an in-fleet/de-fleet indicator, VIN, MVA, make, model, special/regular indicator, radio Id, processed date/time, success/failure indicator, and failure reason. Other fields may also be included. For de-fleeting, the fleet management system 65 will read the data, and communicate to the satellite radio service provider 70, via the service interface management system 75, every vehicle that was removed from the fleet that contained satellite radio equipment. The satellite radio service provider would then remove the vehicle from the program. In the preferred system, in-fleet and de-fleet data is exchanged on a periodic basis, such as on a daily basis.

In order to operate the systems and methods contemplated by the present invention, the vehicle rental service company must share sufficient information with the satellite radio service provider to enable it identify the satellite radio to be activated. For example, the activation message may include the serial number of the specific radio to be activated. If vehicle data is shared with the satellite radio service provider, the vehicle rental service company may share a VIN number, which can be read by the satellite radio service provider, matched with a satellite radio via a data table, and utilized to activate the appropriate radio.

Although the system and method of the present invention has been described in the context of management of the activation/deactivation of satellite radio equipment, persons skilled in the art will recognize that the disclosed systems and methods may be utilized for management of other types of equipment installed in vehicles via satellite or other radio signals. For example, the systems and methods of the present invention may be utilized to manage and activate/deactivate vehicle equipment such as headrest and other television and video monitors, installed GPS systems, dashboard cameras, car backup sensors, radar detectors, and other installable electronic devices designed to enhance the customer experience while renting a vehicle. The systems and methods may also be utilized to manage and activate/deactivate wireless and mobile based services and programming in a rental vehicle, including, for example, access to video games, television programming, movies, internet radio services, news services, directory services, brokerage services, photo-uploading (print and storage) services, instant messaging and chat services, booking and ticketing services, telephone services, reservation services, referral services, location based directory services, and internet access. In accordance with the foregoing descriptions, such equipment and services, provided via a third party, can be requested by a customer, incorporated into a vehicle rental contract, and managed and activated/deactivated by the vehicle rental service company using the systems and methods described herein. As a result, rental customers can access desired services on a per rental basis, while vehicle rental service companies can enhance revenue opportunities by delivering customized equipment and services to each rental customer.

The foregoing examples have been provided merely for the purpose of explanation and are in no way to be construed as limiting of the methods and systems disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A system for managing an installed satellite radio in a rental vehicle, the system comprising:
   a reservation system configured to create vehicle rental reservations in response to customer inquiries, wherein the reservations include a check-out time, a check-in time and a designation of whether satellite radio services are requested;
   a reservation management system including a processor configured to review rental reservations, identify reservations that include a satellite services designation and generate a request for activation of satellite radios in vehicles assigned to the identified rental reservations;
   a server associated with the reservation management system, connected via a network connection to a satellite radio service provider, configured to transmit requests for activation of said satellite radios to the satellite radio service provider;
   a server associated with the satellite radio service provider, configured to receive activation requests from reservation management system server via the network connection, identify the satellite radios associated with the activation requests, and cause the satellite radio service provider to transmit an activation signal to each identified satellite radio, thereby enabling rental customers that have requested satellite radio services in connection with a vehicle rental to receive satellite radio services in the vehicle associated with the reservation during the rental period; and
   a fleet management system configured to:
      generate a list of vehicles in a vehicle rental service fleet including, for each vehicle in the fleet, a designation of whether such vehicle includes satellite radio equipment and an indication of whether such vehicle is eligible to participate in the provision of satellite radio services;
      store fleet data in a fleet management database; and update the fleet data in the fleet management database to reflect vehicles added or removed from the fleet.

2. The system of claim 1, wherein the server associated with the satellite radio service provider is further configured in response to receipt of an activation/deactivation request from the reservation management system server, to cause the satellite radio service provider to transmit a deactivation signal to each identified satellite radio, thereby disabling satellite radio services in a rental vehicle after the rental period is completed and the vehicle is returned.

3. The system of claim 1, wherein the request for activation of the satellite radio is transmitted to the satellite radio service provider from about 5 minutes to about 20 minutes prior to the reservation check-out time.

4. The system of claim 1, wherein the request for activation of the satellite radio is transmitted to the satellite radio service provider at the check-out time.

5. The system of claim 1, wherein the request for activation of the satellite radio is transmitted to the satellite radio service provider after the reservation check-out time.

* * * * *